Dec. 29, 1964     E. W. PEARSON     3,163,175

PRECISION ADJUSTABLE CONTROL VALVE ASSEMBLY

Filed May 22, 1961

INVENTOR.
EUGENE W. PEARSON
BY
Bruce & Brosler
HIS ATTORNEY

United States Patent Office 3,163,175
Patented Dec. 29, 1964

3,163,175
PRECISION ADJUSTABLE CONTROL VALVE ASSEMBLY
Eugene W. Pearson, Orinda, Calif., assignor to Pacific Industrial Manufacturing Co., a corporation of California
Filed May 22, 1961, Ser. No. 111,547
8 Claims. (Cl. 137—315)

This invention relates in general to a control valve assembly for hydraulic and pneumatic systems and more particularly is directed toward a spool type valve assembly which may be critically adjusted to give flow characteristics required in high-performance systems.

A significant problem in manufacturing and operating spool type control valves is the expense and difficulty involved in obtaining precision flow characteristics. Conventional control valves of this type comprise a generally tubular sleeve body member concentrically housing therein a generally tubular spool member, the spool member being slidable within the sleeve member.

In broad terms, the sleeve body has inwardly projecting valving surfaces which encounter outwardly propecting valving surfaces on the spool member. As the spool member is moved axially with relation to the sleeve body, the various valving surfaces move in or out of contact with one another to close or open corresponding ports in the valve body. In high-performance systems it is necessary to have a minimum axial displacement of the spool before the ports are opened, while maintaining a minimum of leakage flow while they are closed.

To achieve such flow characteristics in conventional systems it has been necessary to initially machine the body and spool members so that the valving surfaces have a large overlap. This of course creates a high delay characteristic inasmuch as a relatively large axial displacement of the spool is necessary before the ports are opened. After assembling the valve, the actual extent of delay is noted by placing the valve under flow conditions and testing it. The valve is then disassembled and the valving surfaces are ground a small distance, after which the valve is again assembled and tested to note the reduction in delay. This trial and error process is continued until the desired characteristics are achieved.

Unfortunately, with the conventional valve, even after the desired characteristics are finally achieved, it is generally the situation that normal operation tends to alter the characteristics. Erosion eventually begins to round off the initially sharp valving edges whereby leakage flow develops or is increased. Once this rounding occurs there is little that can be done, because further grinding of the valving edges would only increase the underlap, thereby even further increasing the leakage.

The present invention provides a novel spool type control valve which affords high-performance flow characteristics with a minimum of effort and expense. Once the parts to the instant invention are machined and assembled they need not be taken apart to effect adjustments. Instead, the valving surfaces are adjusted while the valve is assembled and under flow conditions. Moreover, the valve assembly of the instant invention may be adjusted to restore desirable characteristics after the valving surfaces have been slightly deformed from erosion, and if desired, lends itself to refinishing of components to a certain extent, and to the replacement of worn components.

Accordingly, among the objects of the present invention are:

(1) To provide a novel and improved spool type control valve assembly which is easily adjusted to give desired high-performance flow characteristics;

(2) To provide a novel and improved control valve assembly as described above, which need not be disassembled or remachined to be adjusted for desired flow characteristics;

(3) To provide a novel and improved control valve assembly which may be adjusted to maintain desirable flow characteristics after the valve has undergone slight erosion from operational wear;

(4) To provide a novel and improved control valve assembly of the spool type, capable of having worn valving components replaced;

(5) To reduce the cost of manufacturing precision spool type control valves.

The invention possesses other objects and features of advantage, some of which, with the foregoing, will be set forth in the following description of the preferred form of the invention, which is illustrated in the drawings accompanying and forming a part of this specification. It is to be understood, however, that variations in the showing made by the said drawings and description may be adopted within the scope of the invention as set forth in the claims.

Referring to said drawings.

Figure 1:
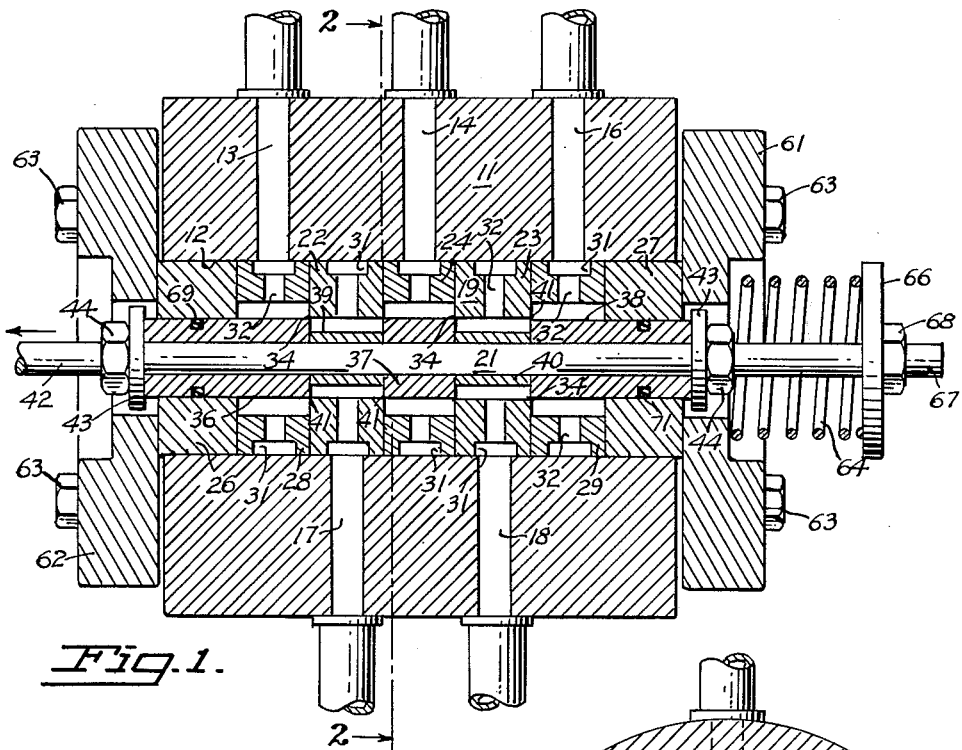
FIGURE 1 is a cross-sectional view, taken through the axis of a preferred embodiment of the invention, while in its intermediate closed or neutral position.
Figure 2:
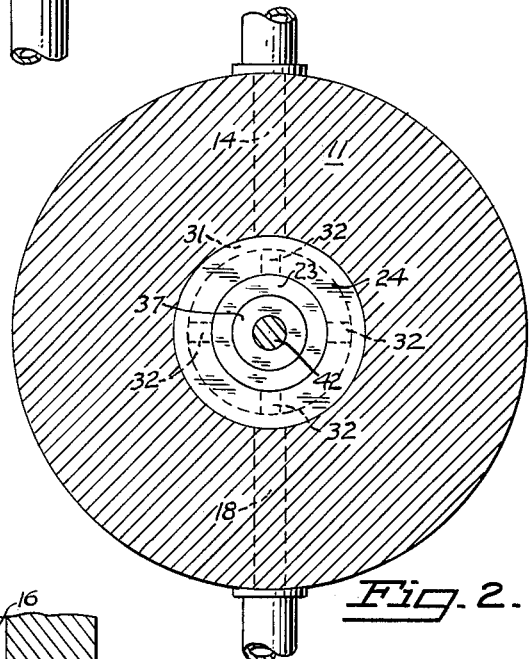
FIGURE 2 is a transverse view in cross-section taken in the plane 2—2 of FIGURE 1.

With general reference now to FIGURES 1 and 2, there is shown a valve body 11 having a longitudinal passageway 12 therethrough and a plurality of ports 13, 14, 16, 17 and 18 connecting with the passageway 12.

A body sleeve assembly 19 is then snugly fitted in the passageway 12, with a spool assembly 21 slidably disposed within the body assembly 19. When the spool assembly 21 is in its normally closed position the various ports in the valve body 11 are closed off from one another, but by axially displacing the spool 21 the ports are placed into communication with one another as is explained hereinafter.

With particular regard now to the body sleeve assembly 19, there are provided a pair of individual body sleeve valve sections 22 and 23 separated from each other by a body sleeve spacer section 24, and from proximate end sections 26 and 27 respectively, by similar body sleeve spacer sections 28 and 29. Each of the body sleeve valve and spacer sections is formed with a peripheral groove 31, in communication with a corresponding body port, and one or more substantially radial passages 32 therethrough, connecting with the groove 31.

By forming the valve sections 22 and 23 of greater radial thickness and accordingly with smaller inside diameters than the adjacent spacer sections 24, 28 and 29, it is seen that the valve sections 22 and 23 each presents valving edges 34 which in the fabrication of the valve sections, can be made quite sharp.

Considering the spool sleeve assembly 21, there are shown three independently formed spool sleeve valve sections 36, 37 and 38, which are respectively separated by spool sleeve spacer sections 39 and 40 of smaller outside diameter, to leave exposed valving edges 41 on the valve sections 36, 37 and 38.

All spool sleeve sections are assembled onto a rod 42 and clamped together between end washers 43 by adjacent end nuts 44 threaded onto the rod and slidably installed within the body sleeve assembly with the spacer sections of the one assembly in substantial alignment with the spool sleeve valve sections of the other assembly. With the outside diameter of the spool sleeve valve sections such as to provide a sliding fit of these sections in the valve sections of the body sleeve assembly, it will become apparent that any existing flow communication between adjacently disposed valve sections may be blocked off by a relative shift between such components.

To appreciate the novel features of the invention, it is beneficial, at this point, to give a general explanation of how a spool type valve operates. In FIGURE 1, the corresponding valving edges 34 and 41 are shown in substantial contact with each other whereby the various body ports are blocked off from one another through the valve.

Figure 3:
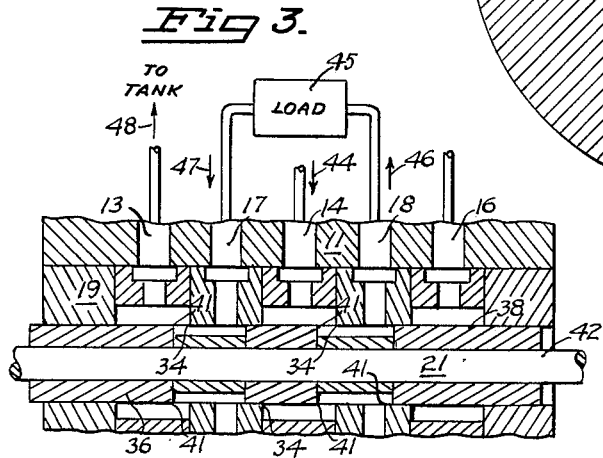
FIGURE 3 is a partially schematic view of the invention while in an open position.

Attention is now directed towards FIGURE 3 wherein is shown a partial section of the upper half of a valve assembly similar to that of FIGURE 1. For purposes of explanation, the body ports 13, 14, 16, 17 and 18 are shown all in line, there being no resulting difference in operation occasioned thereby.

In FIGURE 3, the spool assembly 21 is displaced axially to the left. As a result, port 13 is placed in communication with port 17, and port 14 is placed in communication with port 18. Port 16 remains blocked off. The arrow designated by the reference numeral 44 indicates an input of fluid under pressure into the port 14. The fluid then flows through the valve and out of port 18 into a load 45 as indicated by an arrow 46. As shown by an arrow 47, the fluid leaving the load 45 is then directed back into the valve assembly through the port 17 and finally leaves the valve assembly through the port 13 from where it may be directed into a reservoir tank as indicated by an arrow 48. If the spool assembly is moved to the right instead of left, a similar flow pattern would occur but with the flow reversed through the load and entering the reservoir tank from the port 16.

The magnitude of flow through the instant valve assembly necessarily depends, for the most part, on the extent to which the spool assembly 21 is axially displaced from its intermediate position. If, when the valve spool assembly 21 is positioned as shown in FIGURE 1, the valving edges 34 and 42 have a zero overlap and a zero underlap, and if the valving edges are sharp, the valve assembly will be in a neutral condition and block all flow therethrough. When the spool assembly is moved any distance in either direction, however small, a flow occurs through the valve assembly in one direction or the other depending on the direction of shift of the spool assembly, as there is no delay of flow in opening the valve and no leakage when it is closed, so from a practical standpoint, an approach to this ideal is desired.

Consider, the situation present however, when the various spool and body valve sections happen to be longer than the spool and body spacer sections. In the corresponding neutral condition, adjacent valve sections would slightly overlap one another. As a result, a small axial displacement of the spool assembly would not create an opening between the valving edges 34 and 41 and thus a delayed action will occur before liquid flow through the valve assembly can be expected.

On the other hand, consider the situation where the spacer sections on the body and spool assembly are longer than the valve sections. In this case, the valve sections have an underlap, that is, when the valve assembly is in its presumed neutral or closed position, the valving edges 34 and 42 do not quite seal, and the valve assembly will permit leakage flow therethrough.

In a high-performance system, it is important to realize precision operation from the valve assembly, and by fabricating the assembly of independent valve sections separated by spacer sections along the lines described, the present invention has been made possible.

The spool sleeve spacer sections 39, 40 and the body sleeve spacer sections 24, 28, 29 are all made slightly longer than the various valve sections. Upon initially assembling the body sleeve assembly and spool sleeve assembly as shown in FIGURE 1, therefore, there is achieved a situation wherein the adjacent valving edges have an underlap, i.e. they do not quite seal. To take advantage of this, the aforementioned spacer sections are all fabricated of a compressible resilient material. More particularly, the spacer sections can be made of an aluminum alloy having a high yield strength and a relatively low modulus of elasticity. The important criteria is that the modulus of elasticity of the spacer sections be lower than that of the valve sections, and this is accomplished by then making the valve sections of a hard steel, which would have the added advantage that such material would permit of sharp and durable valving edges 34 and 41.

With such conditions prevailing, application of clamping pressure by the nuts 44 on the sections of the spool assembly, will cause a greater compression of the spacer sections than the valve sections. This will serve to bring the valving edges closer and closer to alignment with the valving edges of the body valve sections until precision alignment is realized, as can be determined by a sharp shut off characteristic of the valve assembly when functioning in an installation.

A similar adjustment can be realized by making the spacer and valve sections of the body sleeve assembly with the same characteristics as those of the spool sleeve assembly and assembling them under adjustable compression by causing the end sections 26 and 27 to initially protrude slightly beyond the ends of the valve body 11 and engaging them with end caps 61, 62 bolted to the valve housing by clamping bolts 63.

In either case, a relief of the compression forces will permit the spacer sections to expand accordingly, so that adjustments may be effected in either direction.

A combination of adjustment of the spool sleeve sections and body sleeve sections will provide a wider range of adjustment and greater sensitivity.

As regards additional features of the instant device, for certain purposes, there may be provided a helical coil spring 64 at one end of the valve assembly, the spring being disposed between the end cap 61 and a disk 66 which is mounted on the proximate end 67 of the rod and retained thereon by a nut 68, the length of spring 64 being such as to normally displace the spool sleeve assembly to the right, thus safely blocking flow through the valve assembly.

By exerting an adjustable pull on the opposite end of the rod to bring the spool sleeve assembly back to within its range of operation, then upon failure of such adjustable pull, the spring 64 will function as a safety factor by returning the spool sleeve assembly to its extreme right position where the valve assembly is again safely blocked against flow therethrough.

To preclude leakage during such operation, O-ring means 69 and 71 are interposed between the spool sleeve assembly and the body sleeve assembly. Similar sealing means (not shown) could, if desired, be provided at either end of the device between the body sleeve assembly and the valve body.

By fabricating the sleeve assemblies in sections, as described, instead of in one piece as per conventional practice, not only can the valve sections and spacer sections be of different materials as pointed out, but they can also be precision ground, in matching sets to assure accuracy and uniformity in manufacture, and when servicing may be required, replacement of sections may be readily accomplished.

Before replacements may be called for, the adjustability of the assembly permits of a certain amount of sharpening of valving edges, thus prolonging the life expectancy of the assembly.

Although the preferred embodiment of the invention shows five ports in the valve body, along with the necessary number of body and spool sleeve sections to open and close these ports, it will be appreciated that the features of the invention can readily be employed in a spool type valve having a smaller or larger number of ports in the valve body.

Further, it will be apparent, that the invention is subject to further alteration and modification without departing from the underlying principles involved, and accordingly while I have illustrated and described the same in its preferred form and in considerable detail, I do not desire to be limited in my protection to such details except as may be necessitated by the appended claims.

I claim:

1. An adjustable servo control valve assembly comprising a valve body having a longitudinal passageway therethrough and a plurality of ports connecting with said passageway; a body sleeve assembly snugly fitting in said passageway, said body sleeve assembly including a pair of individual body sleeve valve sections separated by a body sleeve spacer section, said valve and spacer sections having flow communicating passages connecting said longitudinal passageway with said ports, and said spacer section having a modulus of elasticity less than that of said body sleeve valve sections; a spool assembly slidably disposed within said body sleeve assembly, said spool assembly including a pair of spool sleeve spacer sections and an intermediate spool valve section; said body sleeve spacer section being of a length slightly exceeding that of said spool sleeve valve section; and means for compressing said body spacer section sufficient to bring said body valve sections into critical edge-to-edge valving relationship with said spool valve section for one position of said spool assembly.

2. An adjustable servo control valve assembly comprising a valve body having a longitudinal passageway therethrough and a plurality of ports connecting with said passageway; a body sleeve assembly snugly fitting in said passageway, said body sleeve assembly including a pair of individual body sleeve valve sections separated by a body sleeve spacer section, said valve and spacer sections having flow communicating passages connecting said longitudinal passageway with said ports, said spacer section having a modulus of elasticity less than that of said body sleeve valve sections; a spool assembly slidably disposed within said body sleeve assembly, said spool assembly including a spool sleeve valve section with a spool sleeve spacer section to either side thereof, said body sleeve spacer section being of a length slightly exceeding that of said spool sleeve valve section; means for compressing said body spacer section to the length of said spool sleeve valve section, to bring said body valve sections into critical edge-to-edge valving relationship with said spool valve section for one position of said spool assembly; and means normally urging one of said assemblies axially to a position sufficient to block flow through said valve assembly.

3. An adjustable servo control valve assembly comprising a valve body having a longitudinal passageway therethrough and a plurality of ports connecting with said passageway; a body sleeve assembly snugly fitting in said passageway, said body sleeve assembly including a pair of individual body sleeve valve sections separated by a body sleeve spacer section; said valve and spacer sections having flow communicating passages connecting said longitudinal passageway with said ports, said spacer section having a modulus of elasticity less than that of said body sleeve valve sections; a spool assembly slidably disposed within said body sleeve assembly, said spool assembly including a spool sleeve valve section with a spool spacer section to either side thereof, said spool sleeve spacer sections having a modulus of elasticity less than that of said spool sleeve valve section; each of said body sleeve and spool sleeve spacer sections being of a length slightly exceeding that of their adjacent valve sections; and means for compressing said body sleeve assembly and said spool sleeve assembly independently of each other to bring said body and spool valve sections into critical edge-to-edge relationship for one position of said spool assembly.

4. An adjustable servo control valve assembly comprising a valve body having a longitudinal passageway therethrough and a plurality of ports connecting with said passageway; a body sleeve assembly snugly fitting in said passageway, said body sleeve assembly including a pair of individual body sleeve valve sections separated by a body sleeve spacer section, said valve and spacer sections having flow communicating passages connecting said longitudinal passageway with said ports, said spacer section having a modulus of elasticity less than that of said body sleeve valve sections; a spool assembly slidably disposed within said body sleeve assembly, said spool assembly including a spool sleeve valve section with a spool sleeve spacer section to either side thereof, said spool sleeve spacer sections having a modulus of elasticity less than that of said spool sleeve valve section; each of said body sleeve and spool sleeve spacer sections being of a length slightly exceeding that of their adjacent valve sections; means for compressing said body sleeve assembly and said spool sleeve assembly independently of each other to bring said body and spool valve sections into critical edge-to-edge relationship for one position of said spool assembly; and means normally urging one of said assemblies axially to establish such position and block flow through said valve assembly.

5. An adjustable servo control valve assembly comprising a valve body having a longitudinal passageway therethrough and a plurality of ports connecting with said passageway; a body sleeve assembly snugly fitting in said passageway, said body sleeve assembly including a pair of body sleeve valve sections separated by a compressible resilient body sleeve spacer section, said valve and spacer sections having flow communicating passages connecting said longitudinal passageway with said ports, said body valve sections having an inside diameter less than that of said body spacer sections; a spool sleeve assembly slidably disposed within said body sleeve assembly, said spool assembly including a spool sleeve valve section with a resilient spool sleeve spacer section to either side thereof, said spool sleeve valve section being positionable into substantial alignment with said body sleeve spacer section and having an outside diameter comparable to the inside diameter of said body sleeve valve sections, said spool sleeve spacer sections being in substantial alignment with said body sleeve valve sections when said spool sleeve valve section and said body sleeve spacer section are in alignment, and having an outside diameter less than that of said spool sleeve valve sections; and means for longitudinally compressing said body sleeve assembly and said spool sleeve assembly independently of each other.

6. A valve assembly comprising a valve body assembly having a longitudinal passageway therein, and flow connecting passageways leading therefrom to ports in said body assembly, a spool assembly slidably installed in the longitudinal passageway of said body assembly, one of said assemblies having at least a pair of valve sections separated longitudinally by an independently fabricated intermediate spacer section, the other of said assemblies having at least one valve section and a spacer section to either side thereof, said independently fabricated intermediate spacer section being normally of slightly greater length than sail one valve section and having a modulus of elasticity less than that of its adjacent valve sections, the length of said intermediate spacer section being such as to enable compressibility thereof to at least the length of said one valve section, and means for compressing said intermediate spacer section to bring said pair of valve sections into critical edge-to-edge relationship to said one valve section for one position of said spool assembly.

7. A valve assembly comprising a valve body assembly having a longitudinal passageway therein, and flow connecting passageways leading therefrom to ports in said body assembly, a spool assembly slidably installed in the longitudinal passageway of said body assembly, one of said assemblies having at least a pair of valve sections of hardened steel separated longitudinally by an independently fabricated intermediate spacer section, the other of said assemblies having at least one valve section and a spacer section to either side thereof, said independently fabricated intermediate spacer section being normally of slightly greater length than said one valve section and of metal having a modulus of elasticity less than that of its adjacent hardened steel valve sections, the length of said intermediate spacer section being such as to enable compressibility thereof to at least the length of said one valve section, and means for compressing said intermediate spacer section to bring said pair of valve sections into critical edge-to-edge relationship to said one valve section for one position of said spool assembly.

8. A valve assembly comprising a valve body assembly having a longitudinal passageway therein, and flow communicating passageways leading therefrom to ports in said body assembly, a spool assembly slidably installed in the longitudinal passageway of said body assembly, one of said assemblies having at least a pair of valve sections of hardened steel separated longitudinally by an independently fabricated intermediate spacer section, the other of said assemblies having at least one valve section and a spacer section to either side thereof, said independently fabricated intermediate spacer section being normally of slightly greater length than said one valve section and of an aluminum alloy, the length of said intermediate spacer section being such as to enable compressibility thereof to at least the length of said one valve section, and means for compressing said intermediate spacer section to bring said pair of valve sections into critical edge-to-edge relationship to said one valve section for one position of said spool assembly.

References Cited in the file of this patent

UNITED STATES PATENTS

| | | |
|---|---|---|
| 284,964 | Hyssong | Sept. 11, 1883 |
| 863,405 | Koelkebeck | Aug. 13, 1907 |
| 2,679,829 | Gorrie et al. | June 1, 1954 |
| 2,994,347 | Gottwald | Aug. 1, 1961 |

FOREIGN PATENTS

| | | |
|---|---|---|
| 939,856 | Germany | Sept. 1, 1955 |